(12) United States Patent
Merchant et al.

(10) Patent No.: US 6,287,625 B1
(45) Date of Patent: Sep. 11, 2001

(54) ONE-POT PREPARATION OF VISCOUS DRESSING PRODUCTS

(75) Inventors: Zohar M. Merchant, Wilmette; William Croasmun, Glenview; Robert Class, Wauconda, all of IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/410,259

(22) Filed: Sep. 30, 1999

Related U.S. Application Data

(60) Provisional application No. 60/102,454, filed on Sep. 30, 1998.

(51) Int. Cl.[7] .................................................. A23L 1/24
(52) U.S. Cl. ........................... 426/605; 426/578; 426/613
(58) Field of Search .................................. 426/601, 602, 426/573, 605, 613, 578

(56) References Cited

U.S. PATENT DOCUMENTS

| | | | |
|---|---|---|---|
| 4,119,564 | * | 10/1978 | Van Dam ............................. 252/312 |
| 4,596,715 | * | 6/1986 | Ballard ................................. 426/573 |
| 5,087,471 | * | 2/1992 | Combes ............................... 426/573 |
| 5,137,742 | * | 8/1992 | Bakal ................................... 426/589 |
| 5,209,942 | * | 5/1993 | Bauer ................................... 426/573 |
| 5,221,551 | * | 6/1993 | Fencl ................................... 426/589 |
| 5,378,286 | * | 1/1995 | Chiou ..................................... 127/36 |
| 5,436,019 | * | 7/1995 | Harris ................................... 426/573 |
| 5,624,612 | * | 4/1997 | Sewall .................................. 264/4.1 |
| 5,626,901 | * | 5/1997 | Pedersen .............................. 426/589 |
| 5,641,533 | * | 6/1997 | Pedersen .............................. 426/605 |
| 5,721,004 | * | 2/1998 | James ................................... 426/578 |
| 5,795,614 | * | 8/1998 | Krishnamurthy .................... 426/613 |
| 5,897,905 | * | 4/1999 | Bialek ................................... 426/602 |
| 6,060,106 | * | 5/2000 | Breitbart .............................. 426/573 |
| 6,136,363 | * | 10/2000 | Bialek ................................... 426/573 |

OTHER PUBLICATIONS

Fennema 1985 Food Chemistry Marcel Dekker New York p 288–290.*
Lowe 1937 Experimental Cookery 2nd edition John Wiley New York p266–273, 282–283.*

* cited by examiner

Primary Examiner—Carolyn Paden
(74) Attorney, Agent, or Firm—Fitch, Even, Tabin & Flannery

(57) ABSTRACT

The present invention relates generally to processing of viscous food products such as full-fat, reduced-fat, light or fat-free viscous salad dressings, and reduced-fat, light or fat-free mayonnaise. More particularly, the present invention relates to viscous salad dressings and reduced-fat mayonnaise and methods of making the viscous salad dressings or reduced-fat mayonnaise which are streamlined and are limited to addition of the ingredients to a single mixing apparatus (i.e., a one-pot preparation). Furthermore, the present invention relates to simplified methods of making such viscous dressing products. The present methods are streamlined and do not require the preparation of a separate cooked starch base. This invention also relates to viscous dressing products prepared by the methods provided herein. The organoleptic and sensory properties of the present viscous dressings are similar to those found in conventionally prepared viscous dressings.

18 Claims, 2 Drawing Sheets

ONE-POT PREPARATION OF VISCOUS DRESSING PRODUCTS

This application claims the benefit of U.S. Provisional Application No. 60/102,454, filed Sep. 30, 1998.

FIELD OF THE INVENTION

The present invention relates generally to processing of viscous food products such as full-fat, reduced-fat, light or fat-free viscous salad dressings, and reduced-fat, light or fat-free mayonnaise. More particularly, the present invention relates to viscous salad dressings and reduced-fat mayonnaise and methods of making the viscous salad dressings or reduced-fat mayonnaise which is streamlined and is limited to addition of the ingredients to a single mixing apparatus (i.e., a one-pot preparation).

BACKGROUND OF THE INVENTION

Many viscous salad dressings are oil-in-water emulsions and have certain product properties, such as viscosity, physical stability, and rheological behavior. An emulsion is a preparation established with the use of an emulsifying agent of a deformable liquid (the internal or discontinuous phase) distributed in small globules throughout the body of a second liquid (the external or continuous phase). The continuous phase of the emulsion forms a layer adsorbed around the globules of the discontinuous phase. This modifies the forces of cohesion between these globules, and the forces between these globules in the continuous phase. The globules of the discontinuous phase are generally held together by London-Van der Waals attraction forces, and often form aggregates. Usually, the emulsifier is dissolved, or dispersed, in the continuous phases. An oil-in-water emulsion has oil as the discontinuous phase and an aqueous solution as the continuous phase.

It is generally beneficial to increase the viscosity and/or yield stress of viscous oil-in-water food products (i.e., salad dressings) because such an increase in the rheological properties permits the food products to achieve a desired level of yield stress (i.e., a desired degree of gelation of a spoonable salad dressing or mayonnaise) with the use of smaller quantities of oil. The reduced oil levels can result in a cost savings for preparing the food products. In addition, reduced-fat properties of such food products are a benefit to overweight and obese consumers and/or consumers wishing to reduce fats in their diets. Additionally, a relatively constant yield stress for such oil-in-water emulsion food products (e.g., salad dressings) over time is generally positively correlated with the physical stability of the food products. Thus, oil-in-water emulsion viscous dressing products having a higher yield stress maintained over time will generally also be more stable. It is beneficial to control the stability and rheology of such food products because such control permits the preparation of viscous salad dressings and/or mayonnaise having enhanced flavor and texture qualities.

In addition, conductivity and particle size detection can also be used to measure the stability of oil-in-water emulsions. The stability of an oil-in-water emulsion can be assessed by subjecting the emulsion to centrifugation. For an unstable emulsion, centrifugation at 4000×G for 30 minutes generally results in two new layers: a top cream phase layer and a lower aqueous layer. It may be determined whether an oil layer has formed upon centrifugation of an oil-in-water emulsion by taking a sample of the top layer of the emulsion before centrifugation and a sample of the top layer of the emulsion after centrifugation, dropping each into separate water samples, and testing the conductivity of those water samples. Lower conductivity in the water to which the top layer of the sample subjected to centrifugation has been added indicates that fewer ions are available to detection by conductivity, and this is an indication of the appearance of a cream phase from the emulsion upon centrifugation. Thus, if conductivity drops significantly upon centrifugation, then the emulsion has broken and the emulsion is generally considered as not stable.

Stability of an oil-in-water emulsion can also be tested using particle size measurements. The particle size of oil droplets within the aqueous phase can be determined. Droplets of a narrow range of relatively small sizes are generally indicative of relatively stable emulsions. Such emulsions generally will maintain their emulsified state upon harsh treatment (i.e., centrifugation at 4,000×G for 30 minutes or storage at room temperature for extended periods of time (i.e., months)).

Conventionally, viscous salad dressings use carbohydrates such as starches, and/or cellulose gels and/or gums to provide body (i.e., increase the yield stress of the final product) and stability. Conventionally, viscous salad dressings are manufactured using a two stage process as illustrated in FIG. 1. First, a premix is prepared containing water, oil, eggs or egg products, salt, sugar, and spices. The premix is subjected to high shear to form an emulsion. Second, a starch base is prepared by cooking an aqueous starch mixture; the mixture can contain optional ingredients such as sugar, vinegar, spices, and the like. After cooling, the starch base is added to the premix emulsion as a separate stream under low pressure conditions. The resulting emulsion or dispersion is subjected to low shear to form the desired viscous dressings.

Addition of conventional starches (i.e., without cooking) with the rest of the ingredients and then subjecting such a mixture to high shear produces salad dressings which are usually thin and unstable (i.e., the emulsion breaks, releasing a free oil phase and a free aqueous phase). Thus, this conventional process requires the formation of two different mixtures, and the addition of the starch base to the premix emulsion only after the high shear treatment is completed, to form the emulsion.

Using the formulations and methods of the present invention, viscous dressings can be prepared using a so-called one-pot or single pot preparation. The viscous dressing products generated using the process of this invention display similar rheological properties, particle size, and conductivity properties as viscous salad dressings which have been prepared using conventional and more complex processes (i.e., FIG. 1). In the present invention, it is not necessary to cook the starch base, cool it, and then add it to the premix to generate the viscous dressing product.

Because the present invention allows preparation of viscous dressing products in a single pot or vessel, the separate starch preparation steps of the conventional process are eliminated. Thus, the present invention provides a simpler, more cost effective method of preparing salad dressing and mayonnaise products while maintaining desired organoleptic properties.

Mayonnaise has a Food and Drug Administration ("FDA") Standard of Identity as being composed of 65% fat, and in which carbohydrates may be added merely as sweeteners. However, starch or carbohydrate may be added to reduced-fat, low-fat, light and fat-free mayonnaise as bulking agents. Salad dressing has an FDA Standard of Identity as an emulsified semisolid food prepared from vegetable oils, one or more of acidifying ingredients, one or more of egg yolk-containing ingredients, and a starchy paste. The FDA nutritional labeling regulations recognize "reduced-fat" foods as foods that have at least 25% less fat than an appropriate reference food. "Low-fat" products contain ≦3 g of fat per reference amount and per 50 g if the reference amount is 30 g or less. A product may be identified as "light" based on either a ≧33⅓% reduction in calories or a ≧50% reduction in fat when compared to an appropriate reference food. However, if the "light" product derives ≧50% of its calories from fat, then the product must be reduced in fat by at least 50% compared to the reference food. "Fat-free" products have less than ½ gram fat per reference amount.

For purposes of this disclosure, the term "reduced-fat" viscous salad dressing is intended to include "reduced-fat" viscous salad dressings, "low-fat" viscous salad dressings, and "light" viscous salad dressings as defined by the FDA nutritional labeling regulations. In addition, for purposes of this disclosure, the term "light" viscous salad dressing is intended to include "light" viscous salad dressings as defined by the FDA nutritional labeling regulations ; the term "fat-free" viscous salad dressings is intended to include "fat-free" viscous salad dressings as defined by the FDA nutritional labeling regulations .

In addition, because, by definition, a full-fat mayonnaise cannot contain starches, gums and/or other carbohydrates (except as sweeteners), this disclosure refers to reduced-fat, low-fat, light, and fat-free mayonnaise as "reduced-fat" mayonnaise throughout much of the disclosure. However, for specific embodiments for preparing light mayonnaise alone, the term "light mayonnaise" is used. Likewise, for specific embodiments for preparing fat-free mayonnaise, the term "fat-free mayonnaise" is used.

In addition, viscous dressing products that do not fall into the categories defined by the FDA nutritional labeling regulations (at the time of this disclosure) are encompassed within the bounds of this invention. Such compositions and the methods for making them may be described by the amount of fat contained therein or by the reduction of fat content as compared to the full-fat counterpart.

It is an object of the present disclosure to provide viscous dressing products, such as, for example, viscous salad dressing and reduced-fat mayonnaise, which may be prepared in a streamlined manner using a one-pot system and high shear to provide viscous dressing products having desirable rheological, mouthfeel, and taste characteristics.

It is a further object of the present disclosure to provide methods for preparing viscous dressing products using a streamlined process employing a one-pot system and high shear to yield viscous dressing products with desirable rheological, mouthfeel, and taste characteristics.

SUMMARY OF THE INVENTION

The present invention relates to simplified methods of making viscous dressing products. The present methods are streamlined and do not require the preparation of a separate cooked starch base. Moreover, the methods of this invention provide a one-pot process. This invention also relates to viscous dressing products prepared by the methods provided herein. The organoleptic and sensory properties of the present viscous dressings are similar to those found in conventionally prepared viscous dressings.

Conventionally, reduced-fat viscous salad dressings use carbohydrates such as starches and/or cellulose gels and/or gums to provide body to the salad dressing (i.e., to increase the yield stress). Conventionally, cooked starches are added as a separate stream under low pressure. This requires the formation of a "starch base" wherein the starch, along with other ingredients such as water, sugar, vinegar and spices, is cooked and then subjected to cooling. A separate premix is formed, consisting of water, oil, egg yolks, salt, sugar and spices. The premix is subjected to high shear to form an emulsion. The cooled starch base is then added to the premix emulsion under low pressure and low shear to form the viscous salad dressing. This conventional method is depicted in FIG. 1. Attempts to add uncooked starches with the rest of the ingredients, and then subjecting such a mixture to high shear, produces salad dressings which are generally thin and unstable (i.e. the emulsion breaks, releasing a free oil phase and a free aqueous phase). Thus, this conventional process requires the formation of two different mixtures, and the addition of the cooked and cooled starch base to the premix only after the high shear treatment forming the emulsion is completed.

Using the formulations, and processing steps described herein, in which specified amounts of specified ingredients are processed in specified orders under particular reaction conditions, excellent viscous salad dressings and reduced-fat mayonnaise can be achieved using a so-called "one-pot" method. The viscous salad dressings and reduced-fat mayonnaise generated herein display similar rheological and stability properties as conventional viscous salad dressings. Specific examples of the one-pot methods of the present invention are illustrated in FIGS. 2–5.

For purposes of this invention, a "one-pot" method or preparation as related to viscous dressings is intended to be a process for making viscous dressings which is capable of being carried out, with regard to combining the ingredients, in a single vessel. Moreover, the term includes methods of preparing viscous dressings, as illustrated and described herein (and equivalent methods) in which a conventional starch base is not required. Thus, in the present invention (and for the term "one-pot" as it relates to the present invention), it is not necessary to cook and cool an aqueous starch mixture prior to adding the starch to the other ingredients. Any cold-water-swelling modified food starch or other instant starches which are free-flowing powders, easily blend with other dry ingredients and are readily hydratable in water or dispersible in oil should be suitable.

The present invention provides a method for making a viscous dressing product, said method comprising: (a) dispersing a starch in an edible oil to form a uniform slurry; (b) adding water, an egg product, salt, sugar, a preservative, and a spice to the uniform slurry to form a coarse emulsion; and (c) applying a peak shear force of about 3,000 sec$^{-1}$ to about 20,000 sec$^{-1}$ to the coarse emulsion for a time sufficient to form an emulsion, wherein an edible acid is added either (A) to the coarse emulsion within about 15 seconds before the application of the high shear force or (B) to the emulsion during the application of the high shear force or (C) to the emulsion after the application of the high shear force, to form the viscous dressing product. This method is illustrated in FIG. 2.

The present invention also provides a method for making a fat-free viscous dressing product, said method comprising: (a) dispersing a starch in water to form a uniform slurry; (b) adding water, an egg product, salt, sugar, a preservative, a spice, xanthan, cellulose gel, and an edible acid to the uniform slurry to form a mixture; and (c) applying a peak shear force of about 3,000 sec$^{-1}$ to about 80,000 sec$^{-1}$ to the mixture for a time sufficient to form the fat-free viscous dressing product. This method is illustrated in FIG. 3.

The present invention also provides a method for making a viscous dressing product, said method comprising: (a)

forming a coarse emulsion comprising starch, an edible oil, water, an egg product, salt, a spice, and a preservative under low shear conditions; (b) applying a peak shear force of about 3,000 sec$^{-1}$ to about 20,000 sec$^{-1}$ to the coarse emulsion for a time sufficient to form an emulsion, wherein an edible acid is added either (A) to the coarse emulsion within about 15 seconds before the application of the high shear force or (B) to the emulsion during the application of the high shear force or (C) to the emulsion after the application of the high shear force to form the viscous dressing product. This method is illustrated in FIG. 4.

The present invention also provides a method for making a fat-free viscous dressing product, said method comprising: (a) forming a mixture of a starch, water, an egg product, salt, xanthan, cellulose gel, an edible acid, a spice, and a preservative under low shear conditions; (b) applying a peak shear force of about 3,000 sec$^{-1}$ to about 80,000 sec$^{-1}$ to the mixture for a time sufficient to form the fat-free viscous dressing product. This method is illustrated in FIG. 5.

DETAILED DESCRIPTION OF THE DRAWINGS

DETAILED DESCRIPTION OF THE INVENTION

The present invention provides oil-in-water emulsion viscous salad dressings and mayonnaise in a simple and streamlined process. The resulting viscous dressing products have similar rheological and stability properties to conventional viscous dressing products. The present invention also provides methods for preparing such viscous dressing products.

Figure 2:
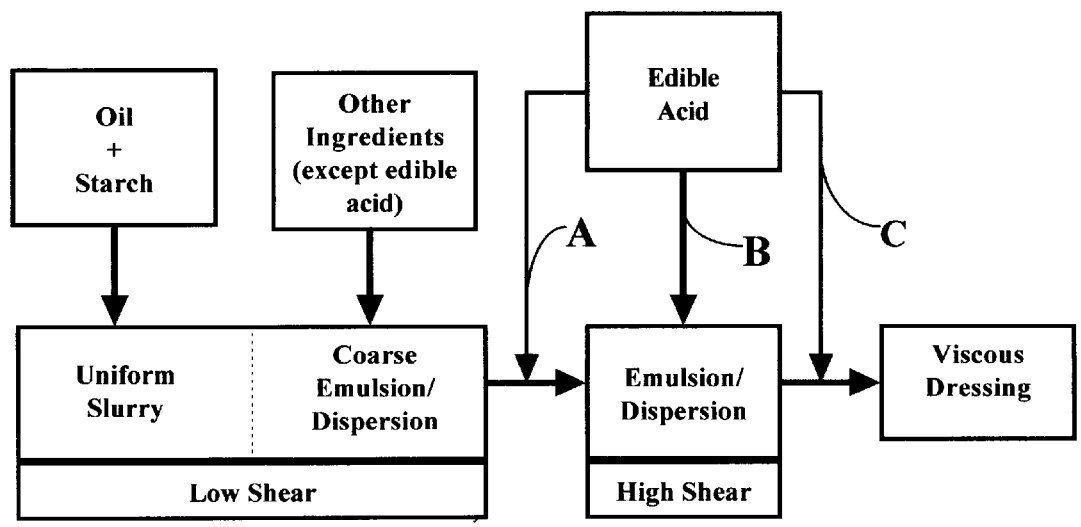
FIG. 2 illustrates one embodiment of the present invention for preparing viscous dressings.

In one embodiment of the invention and as illustrated in FIG. 2, a method for making viscous dressings such as, for example, reduced-fat salad dressings or reduced-fat mayonnaise is provided. This method includes dispersing a starch in oil under low shear conditions to form a uniform slurry. All other ingredients, except the edible acid, are added to the uniform slurry under low shear to form a coarse emulsion. The coarse emulsion is subjected to high shear force for a relatively short period. The edible acid, such as vinegar, is blended into the resulting emulsion either just prior to, during, or after the high shear treatment, resulting in the formation of a viscous dressing product.

Figure 3:
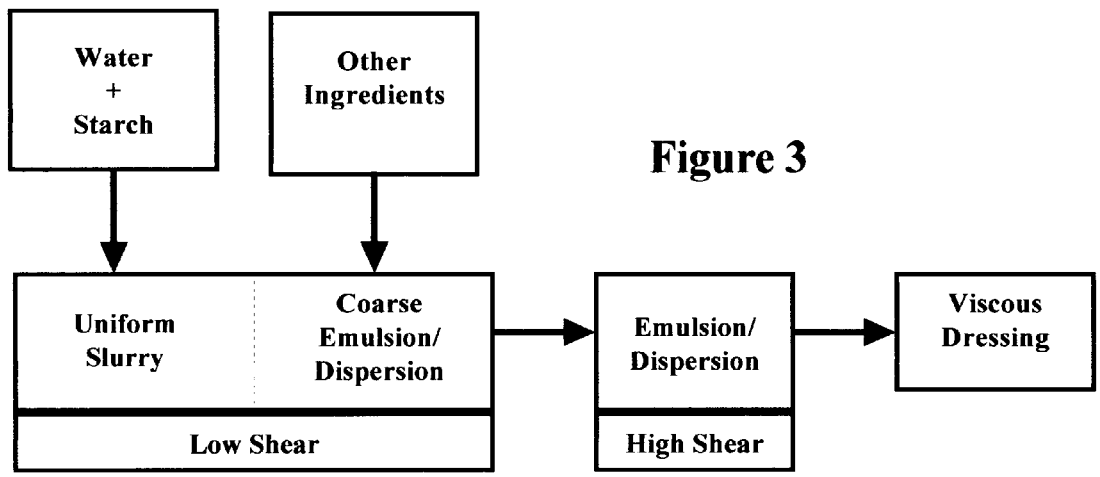
FIG. 3 illustrates another embodiment of the present invention for producing viscous dressings.

In another embodiment of the invention and as illustrated in FIG. 3, a method for making a viscous dressing such as, for example, fat-free viscous salad dressings or fat-free mayonnaise is provided. This method includes dispersing a starch in water under low shear conditions to form a uniform slurry. All other ingredients are added to the uniform slurry under low shear conditions to form a mixture or coarse emulsion. The mixture or coarse emulsion is then subjected to high shear conditions for a relatively short time to form the desired viscous dressing.

Figure 4:
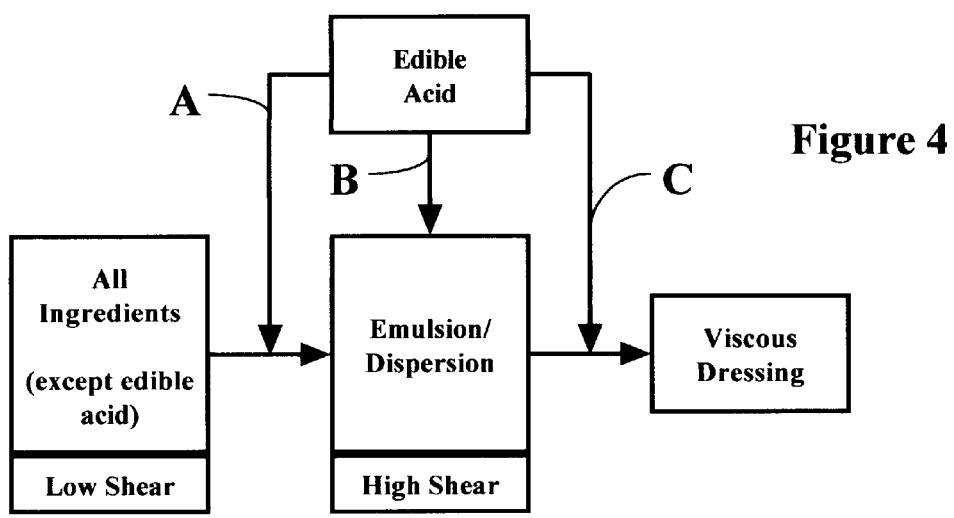
FIG. 4 illustrates yet another embodiment of the present invention for producing viscous dressings.

In another embodiment of the invention and as illustrated in FIG. 4, a method for making viscous dressings such as, for example, full-fat or reduced-fat viscous salad dressings and reduced-fat mayonnaise is provided. All ingredients, except the edible acid, are combined under low shear conditions to form a coarse emulsion. The coarse emulsion is subjected to high shear conditions for a relatively short time period. The edible acid is added to the mixture just prior to, during, or after the high shear treatment to form the viscous dressing. Fat-free compositions can be prepared if no oil is added.

Figure 5:
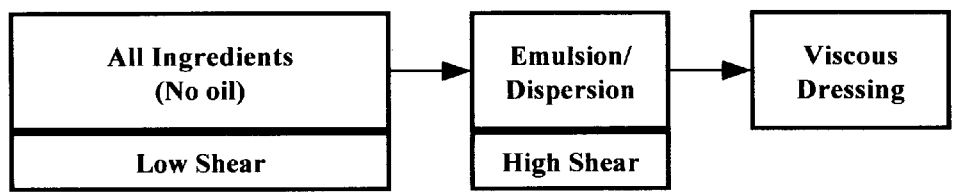
FIG. 5 illustrates still another embodiment of the present invention for producing viscous dressings.

In yet another embodiment and as illustrated in FIG. 5, a fat-free viscous dressing can be prepared. All ingredients are mixed under low shear conditions to form a mixture which is then subjected to high shear for a relatively short time to form the viscous dressing. If a fat-free product is desired, no oil is added.

The fat-free viscous dressing products prepared by the methods of the present invention generally contain about 2.4 to about 4.0 percent starch, about 6.0 to about 10 percent salt, and sweetener, about 1.5 to about 2.5 percent gum, about <1.0 to about 5.5 percent one or more spices or flavorings, natural and/or artificial colors, flavors, vitamins, and preservatives, about <1.0 to about 5.0 percent edible acid, and about 75 to about 85 percent water. Although these fat-free viscous dressing products are essentially oil free, a small amount (generally less than about 0.5 percent) of oil can be added with the egg product and/or spice ingredients. Of course, other conventional ingredients can be added if desired.

The oil-containing viscous dressing products prepared by the methods of this invention generally contain about 2.4 to about 4.5 percent starch, about 2.0 to about 6.0 percent egg product, spices, flavorings, and preservatives, about 6.0 to about 10.0 percent salt and sweetener, about 1.0 to about 8.0 percent edible acid, about 33 to about 75 percent oil, and about 20 to about 50 water. Of course, other conventional ingredients may also be added.

The starches of the present invention are cold water swelling, modified food starches which can be easily dispersed in hot and cold liquids. These starches are generally agglomerated and/or cross-linked. While not wishing to be limited by theory, we believe that these starches remain dispersed and hydrated in the aqueous phase of the coarse emulsions, dispersions, or mixtures prior to the high shear treatment step. When subjected to short periods of high shear at certain ranges of flow rates and at a certain temperature ranges, the hydrated starch stabilizes the resulting emulsion or dispersion. The resulting emulsions or dispersions have yield stress values ranging from about 150 τ(Pa) to about 400 τ(Pa) for the light and fat-free products; and yield stress values ranging from about 200 τ(Pa) to about 400 τ(Pa) for other products. Generally, for all products (except the fat-free viscous dressing products) the pH is dropped to about 3 to about 5, preferably about 3.0 to about 4.0, by the addition of an edible acid, just prior to, during, or just after the emulsion is formed by high shear treatment. The addition of an edible acid is illustrated in FIG. 2 and FIG. 4. Pathway A illustrates the addition of edible acid just prior to the high shear treatment; pathway B illustrates the addition during the high shear treatment; and pathway C illustrates the addition after the high shear treatment. The dispersed, agglomerated starch, as well as egg products, proteins and/or emulsifiers, serve to stabilize the resulting oil-in-water emulsions or dispersions.

In contrast, in the fat-free products, an aqueous starch slurry (FIG. 3) may be formed by adding the starch to water with mixing. In such an embodiment, a coarse emulsion is formed upon adding all the ingredients to the aqueous starch slurry only if there is sufficient fat added by the addition of egg yolk or flavorings dispersed in oil. It is acceptable to add the edible acid along with all the other ingredients to form a mixture. While the egg product and flavoring ingredients may provide a small amount of oil (generally less than about 0.5 percent), the hydrated starch stabilizes the dispersion or emulsion resulting from subjecting this mixture to high shear. Alternatively, all ingredients of the fat-free viscous dressing product may be mixed together (as illustrated in FIG. 5), rather than forming an aqueous starch slurry initially. Since the only oil present in these fat-free products is derived from the egg product and flavoring (if the flavoring is dispersed in oil), generally a dispersion rather than an emulsion is established upon the formation of such fat-free viscous dressing products. The resulting fat-free dressing products generally have yield stress values ranging from about 150 τ(Pa) to about 400 τ(Pa).

Starches suitable for use in the present invention are agglomerated and readily hydrated starches. Alternatively, such starches are food starches which are modified; specifically, these are instant starches which are acid-resistant and shear-tolerant. Examples of such starches which may be used to practice the present invention include, but are not limited to, cold water swelling, modified waxy maize corn starches, cold water swelling, modified dent corn starches, other varieties of cold water swelling, modified corn starch, modified potato starches, and other instant starches. Commercially-available examples of such starches include, but are not limited to, Mira-Sperse 623™, Mira-Sperse 626™, Mira-Sperse 629™, Mira-Gel 463™, Mira-Thik 603™, Mira-Thik 606™, Mira-Thik 609™ (A.E. Staley Manufacturing Co., Decatur, Ill.), and Ultrasperse M™ (National Starch & Chemical Co., Bridgewater, N.J.) Preferably, either Mira-Thik 603™ or Mira-Sperse 623™ is used to practice the present invention.

Except for the starch, the ingredients used in the present invention are conventional ingredients normally used in viscous dressings. Examples of edible oils that can be used in the present invention include vegetable oil, olive oil, corn oil, soybean oil, canola oil, sunflower seed oil, peanut oil, sucrose fatty acid polyesters, and the like. Other edible oils may also be used. Mixtures of such edible oils may also be used.

Examples of egg products for use in the present invention include, but are not limited to, egg yolks, eggs, salted egg yolks, salted eggs, spray-dried egg yolk powder, spray-dried egg powder, egg whites and the like. Sweeteners that may be used include, but are not limited to, for example, sugar, high fructose corn syrup, sucralose, and the like. The spices and flavorings that may be used include, but are not limited to, for example, natural flavors, mustard flour, paprika, dried cream, and the like. The gums that may be used include, but are not limited to, for example, xanthan gum, guar, cellulose gel, and the like. Preservatives that may be used, include, but are not limited to, for example, potassium sorbate, calcium disodium EDTA, and the like. Edible acids that may be used include, but are not limited to, for example, vinegar, lemon juice, lime juice, acetic acid, phosphoric acid, lactic acid, citric acid, any combination of edible acids and the like.

As indicated in FIGS. 2–5, the various mixtures, emulsions, and/or dispersions are exposed to both low and high peak shear conditions. For purposes of this invention, peak shear is considered to be about less than about 1,000 sec$^{-1}$, and preferably less than about 200 sec$^{-1}$; for full-fat and reduced-fat viscous dressing products, peak shear is considered to be about 3,000 sec$^{-1}$ to about 20,000 sec$^{-1}$, and preferably about 10,000 sec$^{-1}$ to about 20,000 sec$^{-1}$; for fat-free viscous dressing products, peak shear is considered to be about 3,000 to about 80,000 sec$^{-1}$, and preferably about 10,000 sec$^{-1}$ to about 20,000 sec$^{-1}$. Generally, different devices can be used to apply the low and high shear conditions required in the method of this invention. Suitable low shear devices include, for example, Lightnin™ mixer (Lightnin, Rochester, N.Y.), and the like. The high shear devices should be capable of delivering high shear to a mixture for a short time, in a controlled manner. Such devices include, but are not limited to, colloid mills, homogenizers, and the like. Specific high shear devices which have been found to be suitable include, but are not limited to, Pentax™ KMF-15 Mixer (Bran-Luebbe, Buffalo Grove, Ill.), Ross™ Mixer (Charles Ross & Sons Co., Hauppauge, N.Y.), Sonolator™ (Sonic Corp., Stratford, Conn.), Burdosa™ (Burdosa Technology Ltd., London, UK), Hydroshear™ (AVP Gaulin, Wilmington, Mass.), and the like. It is important that such high shear devices be subject to control so that very short periods of high shear may be delivered as required to form the mixture, emulsion, or dispersion as needed.

Generally, the following methods have been used to evaluate the viscous dressings of the present invention: centrifugation and conductivity, yield stress, and particle size. Centrifugation of a conventional emulsion at about 4,000×G for about minutes will generally cause the emulsion to break down into a cream phase upper layer and an aqueous phase lower layer with a clear interface between the two layers. One test for the presence of the cream phase upper layer is conductivity testing. After centrifugation of the emulsion, a drop of the upper layer is removed and dropped into a sample of water. If the conductivity of that sample of water drops, this is an indication that fewer ions are available to detection by the conductivity meter, which indicates that the emulsion has broken; that is, a cream phase has separated from the emulsion and is detectable at the layer on top of any remaining emulsion.

Emulsions of the present invention have been tested rheologically to determine yield stress in τ(Pa). Measurements of yield stress may be made with conventional instruments such as, for example, a Haake VT 550 (Karlsruhe, Germany). Yield stress is an indication of the degree of gelation of the emulsion. Intuitively, it is desirable to have relatively higher yield stress characteristics for viscous salad dressings than, for example, pourable dressings.

Particle size determination was also used to analyze the oil droplets of the viscous dressing products formed using the present invention. This analysis represents the average size of the oil droplets dispersed in the aqueous phase of an oil-in-water emulsion. Such analyses were performed using a conventional particle size detector (i.e., Horiba™ Laser Diffraction Particle Size Distribution Analyzer LA-500 (Irvine, Calif.)). The microstructure of the emulsion formed using the present invention tended to be small (i.e., about 1.5 to about 3.5μ) oil droplets with a relatively narrow size range, indicating relatively stable emulsions.

In addition, organoleptic analyses of the viscous dressing products of the present invention indicate that these products are comparable in mouthfeel, flavor and lubricity to conventional viscous dressing products.

Full-fat and reduced-fat viscous salad dressings and reduced-fat mayonnaise can be prepared according to the processes illustrated in FIGS. 2 and 4. The starch in FIG. 2 is dispersed in oil at a temperature from about 5° C. to about 60° C. at a low shear rate. To this slurry are added egg products, spices, flavors, preservatives, gums (where appropriate), sugar, salt, and water. This mixture is mixed at low shear for about 1–5 minutes at a temperature from about 5° C. to about 60° C. to form a mixture or coarse emulsion. Alternatively, as illustrated in FIG. 4, the starch-in-oil slurry need not be made. Instead, all of the ingredients (except the edible acid) may be mixed at a low shear rate at a temperature ranging from about 5° C. to about 60° C. to form the mixture or coarse emulsion.

The resulting mixture (i.e., the coarse emulsion/dispersion of FIG. 2 or the mixture of all ingredients except edible acid of FIG. 4 ) is subjected to high shear in a conventional high shear device. The high shear device normally delivers peak shear values of about 3,000 sec$^{-1}$ to about 20,000 sec$^{-1}$, preferably 10,000 sec$^{-1}$ to about 20,000 sec$^{-1}$. The flow rate of the mixture through the device is normally controlled so that the mixture is exposed to the high shear treatment for about <2 to about 30 seconds, preferably about 5 to about 15 seconds and at a temperature of about 5 to about 60° C. Edible acid is added at either (A) within about 30 seconds, preferably within 15 seconds, of the beginning of the high shear treatment (pathway A in FIGS. 2 and 4), (B) during the high shear treatment (pathway B) or (C) after the high shear treatment (pathway C). Sufficient edible acid is added to drop the pH of the viscous dressing product to about 3 to about 5 within about 24 hours.

Fat-free viscous salad dressings or fat-free mayonnaise can be prepared according to the processes illustrated in FIGS. 3 and 5. The starch in FIG. 3 is dispersed in water at a temperature from about 5° C. to about 60° C. at a low shear rate. To this slurry are added egg products, spices, flavors, preservatives, xanthan, cellulose gel, sugar, salt, water, and edible acid to form a coarse emulsion or mixture. This coarse emulsion or mixture is blended at peak shear from about 3,000 sec$^{-1}$ to about 80,000 sec$^{-1}$ to form the viscous dressing. Alternatively, the initial starch-in-water slurry, as illustrated in FIG. 3, is not required. Instead, all of the ingredients may be mixed at a low shear rate at a temperature from about 5° C. to about 60° C., and then exposed to peak shear from about 3,000 sec$^{-1}$ to about 80,000 sec$^{-1}$ to form the viscous dressing. For either of the processes illustrated in FIGS. 3 and 5, the high shear device normally delivers a peak shear value of about 3,000 sec$^{-1}$ to about 80,000 sec$^{-1}$. The flow rate through the device is controlled so that the mixture is exposed to the high shear treatment for about <0.1 to about 30 seconds, preferably from about <0.1 to about 15 seconds.

If the edible acid is added significantly prior to the application of high shear in FIGS. 2 and 4 (i.e., more than about 30 seconds prior to the high shear treatment), the emulsion formed is unstable, (i.e., breaks down into a cream phase or an oil phase and an aqueous phase). While not wishing to be limited by theory, it is believed that the emulsion formed by the application of high shear must be established just before or while the pH is dropped from a range of about 5.5 to about 7.5 to the pH of the viscous dressing product ranging from about 3 to about 5.

The data in the following Examples demonstrate the characteristics of the viscous dressings generated by the present invention. The amount of oil used in each full-fat sample will result in about 40% to about 47% total oil in the sample, including any fat from the egg products or other ingredients. In the tables, "RO" means "reduced oil" relative to the full-fat product; thus, 5% RO and 10% RO mean that the amount of oil present is 5 and 10 percent less, respectively, than the full-fat counterpart. In Tables VII–IX, the samples that indicate that 1% Mira-Gel™ is added indicate that of the 3.3% instant starch utilized in that sample, 1% of the total instant starch utilized is Mira-Gel™.

Figure 1:
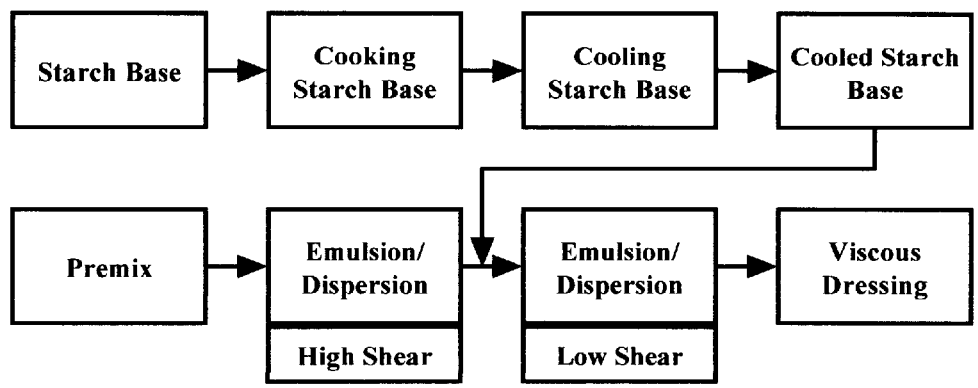
FIG. 1 illustrates a conventional process for preparing viscous dressings.

Viscous salad dressings prepared by the method of FIG. 1 typically have a yield stress of τ(Pa) between about 325 and about 425 after 24 hours, a yield stress τ(Pa) between about 300 and about 425 after 12 weeks, a mean particle size (μ) between about 2 and about 4 after 24 hours or four weeks, and a change in conductivity of less than 10% measured after 24 hours or after 4 weeks.

The following Examples are intended to illustrate the invention and not to limit it. The viscous salad dressings and reduced-fat mayonnaise of the present invention are stable, as demonstrated by the data presented below, and have desirable mouthfeel and textural characteristics. All percentages used herein are by weight, unless otherwise indicated.

EXAMPLE 1

One-Pot Process for a Full-Fat Viscous Salad Dressing or Reduced-Fat Mayonnaise

This Example illustrates the process of this invention illustrated in FIG. 4. The formula used for making full-fat viscous dressings using the methods of this invention are set forth below:

| Ingredient | Sample 1 (Wt %) | Sample 2 (Wt %) | Sample 3 (Wt %) | Sample 4 (Wt %) | Sample 5 (Wt %) | Sample 6 (Wt %) |
|---|---|---|---|---|---|---|
| H$_2$O (60° C.) | 32.25 | 32.4 | 32.55 | 32.7 | 32.7 | 33.0 |
| Egg product, spices, flavorings, preservatives | 5.1 | 5.1 | 5.1 | 5.1 | 5.1 | 5.1 |
| Sugar/Salt | 8.7 | 8.7 | 8.7 | 8.7 | 8.7 | 8.7 |
| Oil | 43.3 | 43.3 | 43.3 | 43.3 | 43.3 | 43.3 |
| Instant Starch | 3.15 | 3.0 | 2.85 | 2.7 | 2.7 | 2.4 |
| Vinegar | 7.5 | 7.5 | 7.5 | 7.5 | 7.5 | 7.5 |

All ingredients (except vinegar) are added in a low shear mixer such as a Lightnin™ mixer and mixed for 1–5 minutes to form a thin coarse emulsion. This emulsion was passed through the high shear device such as a Pentax™ mixer parallel with addition of vinegar in the high shear device to form a viscous emulsion dressing product. Vinegar may be added at a point in the apparatus immediately prior to, immediately after, or directly into the high shear region of the high shear device. The coarse emulsion and vinegar flow rates in the high shear device were maintained at a ratio of about 92.5 to about 7.5, respectively. The peak shear rate was about 17,000 sec$^{-1}$. Various parameters were measured as a function of time. Samples were stored in closed containers at refrigerator temperatures. The results of such testing are reported in Tables I–III.

TABLE I

Yield Stress as a Function of Time

| Sample Number/ Starch | Yield Stress τ(Pa) | | | | | |
|---|---|---|---|---|---|---|
| | 24 Hrs. | 1 wk. | 2 wks. | 4 wks. | 8 wks. | 12 wks. |
| #1 Ultrasperse-M ™ | 280.50 | 271.00 | 245.00 | 231.00 | 210.50 | 216.00 |
| #2 Ultrasperse-M ™ 3.00% | 210.00 | 210.50 | 197.50 | 198.00 | 180.00 | 184.50 |
| #3 Ultrasperse-M ™ 2.85% | 208.50 | 187.00 | 175.50 | 174.00 | 162.00 | 164.00 |
| #4 Ultrasperse-M ™ 2.70% | 179.00 | 166.00 | 156.50 | 156.00 | 146.00 | 148.00 |
| #5 Potato Starch 2.7% | 229.00 | 245.50 | 268.00 | 287.00 | 263.50 | 258.00 |
| #6 Potato Strach 4% | 218.50 | 228.50 | 248.50 | 267.00 | 247.50 | 241.50 |

TABLE II

Mean Particle Size as a Function of Time

| Sample Number/Starch | Mean Particle Size (μ) | |
|---|---|---|
| | 24 hrs. | 4 wks. |
| #1 / Ultrasperse M ™ 3.15% | 2.03 | 2.19 |
| #2 / Ultrasperse M ™ 3.00% | 2.21 | 2.20 |
| #3 / Ultrasperse M ™ 2.85% | 2.24 | 2.35 |
| #4 / Ultrasperse M ™ 2.70% | 2.33 | 2.26 |
| #5 / Potato Starch 2.7% | 1.86 | 1.99 |
| #6 / Potato Starch 2.4% | 1.81 | 1.99 |

TABLE III

Change in Conductivity as a Function of Time.

| Sample Number/Starch | Change of Conductivity (%) | | |
|---|---|---|---|
| | 24 hrs. | 4 wks. | 8 wks. |
| #1 / Ultrasperse M ™ 3.15% | 0.00 | 4.41 | 5.22 |
| #2 / Ultrasperse M ™ 3.00% | 0.00 | 8.99 | 9.52 |
| #3 / Ultrasperse M ™ 2.85% | 0.00 | 1.72 | 2.01 |
| #4 / Ultrasperse ™ 2.70% | 0.00 | 3.33 | 3.24 |
| #5 / Potato Starch 2.7% | 3.36 | 10.55 | 9.45 |
| #6 / Potato Starch 2.4% | 2.82 | 6.92 | 7.10 |

As can be seen from the data presented here, the yield stress, mean particle size, and change in conductivity of the viscous dressing products of the invention are comparable to those parameters as measured in a conventionally-generated viscous dressing.

EXAMPLE 2

One-Pot Process for a Full-Fat Viscous Salad Dressing or Reduced-Fat Mayonnaise

A high-fat viscous dressing containing the following ingredients was prepared using the one-pot procedure as described in Example 1.

| Ingredient | Sample 1a (Wt. %) | Sample 2 (Wt. %) | Sample 7 (Wt. %) |
|---|---|---|---|
| H₂O (60° C.) | 31.9 | 31.4 | 32.25 |
| Egg product, spices, flavorings, preservatives | 5.1 | 5.1 | 5.1 |
| Sugar/Salt | 8.7 | 8.7 | 8.7 |
| Oil | 43.3 | 43.3 | 43.3 |
| Instant Starch | 3.5 | 4.0 | 3.15 |
| Vinegar | 7.5 | 7.5 | 7.5 |

The results of the yield stress, oil particle size, and percent change in conductivity for these formulations are reported in Tables IV–VI.

TABLE IV

Yield Stress as a Function of Time

| Sample Number/Starch | Yield Stress τ(Pa) | | | | |
|---|---|---|---|---|---|
| | 24 hrs. | 2 wks. | 4 wks. | 8 wks | 12 wks. |
| #1a / Ultrasperse M ™ 3.5% | 375.00 | 318.50 | 304.00 | 257.50 | 285.00 |
| #2 / Ultrasperse M ™ 4.0% | 413.00 | 357.50 | 339.50 | 288.00 | 335.00 |
| #7 / Ultrasperse M ™ 3.15% | 311.50 | 262.50 | 232.00 | 215.00 | 224.00 |

TABLE V

Particle Size as a Function of Time

| Sample Number/Starch | Mean Particle Size (μ) | |
|---|---|---|
| | 24 hrs. | 4 wks. |
| #1a / Ultrasperse M ™ 3.5% | 2.00 | 2.42 |
| #2 / Ultrasperse M ™ 4.0% | 1.84 | 2.59 |
| #7 / Ultrasperse M ™ 3.15% | 2.01 | 2.54 |

TABLE VI

Change in Conductivity at Four Weeks

| Sample Number/Starch | Change in Conductivity (%) at 4 Weeks |
|---|---|
| #1a / Ultrasperse M ™ 3.5% | 9.06 |
| #2 / Ultrasperse M ™ 4.0% | 17.54 |
| #7 / Ultrasperse M ™ 3.15% | 8.80 | low shear Lightnin™ mixer for 1–5 minutes to form a thin coarse emulsion. This emulsion was passed through a high shear Pentax™ parallel mixer. Vinegar was added in the high shear device during the high shear treatment to form a viscous emulsion dressing product or reduced-fat mayonnaise. The coarse emulsion to vinegar flow rates in the high shear device were maintained at a ratio of about 92.5 to 7.5 respectively. The peak shear rate was about 17,000 sec$^{-1}$. The specific starches used and the results of the yield stress, oil particle size, and percent change in conductivity over time are reported in Tables VII–IX. Samples were stored in closed containers at refrigerator temperatures.

TABLE VII

Yield Stress as a Function of Time

| | Yield Stress τ(Pa) | | | | | |
|---|---|---|---|---|---|---|
| Sample Number/Starch | 24 hrs | 1 wk | 2 wks | 4 wks | 8 wks (ave.) | 12 wks (ave.) |
| #1/Ultrasperse M ™ 3.3% | 351.00 | 337.00 | 342.00 | 358.50 | 321.50 | 292.50 |
| #2/,Ultrasperse M ™ 3.3%, Mira-Gel ™ 1% | 358.00 | 350.00 | 359.00 | 354.00 | 350.00 | 313.50 |
| #2/Ultrasperse M ™ 3.3%, Mira-Gel ™ 1% | 302.00 | 327.00 | 321.00 | 322.00 | | |
| #1/Mira-Sperse 623 ™ 3.3% | 385.00 | 369.00 | 357.00 | 359.00 | 358.00 | 317.00 |
| #2/Mira-Sperse 623 ™ 3.3%, Mira-Gel ™ 1% | 398.00 | 362.00 | 364.00 | 371.00 | 349.00 | 311.00 |
| #1/Ultrasperse M ™ 3.3%[1] | 300.50 | 276.50 | 275.50 | 265.00 | 266.00 | 249.00 |
| #2/Ultrasperse M ™ 3.3% Mira-Gel ™ 1%[1] | 300.00 | 268.50 | 266.00 | 263.50 | 258.00 | 247.00 |
| #1/Mira-Sperse 623 ™ 3.3%[1] | 335.00 | 322.50 | 315.50 | 308.00 | 294.00 | 276.00 |
| #2/Mira-Sperse 623 ™ 3.3% Mira-Gel ™ 1%[1] | 341.00 | 304.50 | 316.00 | 319.50 | 157.00 | 151.00 |

[1]Reduced shear history.

EXAMPLE 3

One Pot Process for a Full-Fat Viscous Salad Dressing or Reduced-Fat Mayonnaise

This example illustrates the process of FIG. 4. The formula for the one pot preparation of full-fat salad dressing or reduced-fat mayonnaise is set forth below:

| Ingredient | Sample 1 (Wt %) | Sample 2 (Wt %) |
|---|---|---|
| H$_2$O | 32.1 | 32.1 |
| Egg product, spices, flavors and preservatives | 5.1 | 5.1 |
| Sugar/salt | 8.7 | 8.7 |
| Oil | 43.3 | 43.3 |
| Instant Starch | 3.3 | 3.3 |
| Vinegar | 7.5 | 7.5 |

In a one pot process for making a full-fat viscous salad dressing or reduced-fat mayonnaise, all the components listed in the component table, except vinegar, are added in a

TABLE VIII

Mean Particle Size as a Function of Time

| | Mean Particle Size (μ) | | |
|---|---|---|---|
| Sample Number/Starch | 24 hrs | 4 wks | 3 mos |
| #1/Ultrasperse M ™ 3.3% | 1.88 | 1.88 | 2.03 |
| #2/Ultrasperse M ™ 3.3%, Mira-Gel ™ 1% | 1.84 | 1.77 | 1.89 |
| #2/Ultrasperse M ™ 3.3%, Mira-Gel ™ 1% | 1.90 | 1.89 | — |
| #1/Mira-Sperse 623 ™ 3.3% | 1.85 | 1.86 | 1.94 |
| #2/Mira-Sperse 623 ™ 3.3%, Mira-Gel ™ 1% | 1.95 | 1.91 | 2.08 |
| #1/Ultrasperse M ™ 3.3%[2] | 1.95 | 1.99 | — |
| #2/Ultrasperse M ™ 3.3%, Mira-Gel ™ 1%[2] | 2.22 | 2.02 | — |
| #1/MiraSperse 623 ™ 3.3%[2] | 1.97 | 2.03 | — |
| #2/Mira-Sperse 623 ™ 3.3% Mira-Gel ™ 1%[2] | 1.79 | 2.01 | — |

[2]Reduced shear history.

TABLE IX

Change in Conductivity as a Function of Time.

| Sample Number/Starch | Change of Conductivity (%) | | |
|---|---|---|---|
| | 24 hrs | 4 wk | 3 mos. |
| #1/Ultrasperse M ™ 3.3% | 12.63 | 4.50 | 5.10 |
| #2/Ultrasperse M ™ 3.3%, Mira-Gel ™ 1% | 10.60 | 3.74 | 4.52 |
| #2/Ultrasperse M ™ 3.3%, Mira-Gel ™ 1% | 9.00 | 4.24 | — |
| #1/Mira-Sperse 623 ™ 3.3% | 7.55 | 4.93 | 5.23 |
| #2/Mira-Sperse 623 ™ 3.3%, Mira-Gel ™ 1% | 9.76 | 6.27 | 6.98 |
| #1/Ultrasperse M ™ 3.3%[3] | 10.81 | 5.76 | — |
| #2/Ultrasperse M ™ 3.3% Mira-Gel ™ 1% | 8.07 | 7.74 | — |
| #1/Mira-Sperse 623 ™ 3.3%[3] | 10.30 | 6.95 | — |
| #2/Mira-Sperse 623 ™ M 3.3% Mira-Gel ™ 1%[3] | 9.40 | 9.68 | — |

[3]Reduced shear history.

As can be seen from the data presented here, the yield stress, mean particle size, and change in conductivity of the viscous dressing products of the invention are comparable to those parameters as measured in a conventionally-generated (control) viscous dressing.

EXAMPLE 4

One-Pot Process for Full-Fat Viscous Salad Dressing or Reduced-Fat Mayonnaise

In a one pot process for making a full-fat viscous dressing or reduced-fat mayonnaise, all the components below are added as described below. This example illustrates the process of FIG. 4.

| Ingredient | Wt % |
|---|---|
| H$_2$O | 32.1 |
| Egg products, spices, flavors and preservatives | 5.1 |
| Sugar/salt | 8.7 |
| Oil | 43.3 |
| Instant Starch | 3.3 |
| Vinegar | 7.5 |

In a one pot process for making a full-fat viscous salad dressing or reduced-fat mayonnaise, all the components listed in the component table, except vinegar, are added in a low shear Lightnin™ mixer for 1–5 minutes to form a thin coarse emulsion. This emulsion was passed through a high shear Pentax™ parallel mixer. Vinegar was added in the high shear device during the high shear treatment to form a viscous emulsion dressing product or reduced-fat mayonnaise. The coarse emulsion to vinegar flow rates in the high shear device were maintained at a ratio of 92.5 to 7.5 respectively. The peak shear rate was about 17,000 sec$^{-1}$. In this Example, the premix was added immediately or held up to 8 hours before applying high shear and adding the edible acid. As can be seen from these yield stress results, even holding the premix prior to subjecting to high shear and the addition of vinegar results in a product with substantial yield stress. The values of the yield stress of the products generated using this process are reported in Table X.

TABLE X

Yield Stress as a Function of Time

| Sample | Time Held (hrs) | Yield Stress τ(Pa) | | | | |
|---|---|---|---|---|---|---|
| | | 4–6 hrs | 24 hrs | 1 week | 2 weeks | 1 month |
| 1 | 0 | 364 | 399 | 416 | 400 | 352 |
| 2 | 1 | 324 | 345 | 411 | 371 | 332 |
| 3 | 2 | 324 | 321 | 353 | 352 | 323 |
| 4 | 4 | 269 | 290 | 319 | 297 | 270 |
| 5 | 6 | 236 | 223 | 249 | 250 | 232 |
| 6 | 8 | | 220 | 226 | 221 | 205 |

EXAMPLE 5

One Pot Process for Full-Fat Viscous Salad Dressing or Reduced-Fat Mayonnaise Utilizing Three Different Flow Rates On High Shear Mixer This example illustrates the process of FIG. 4. In a one pot process for making a full-fat viscous dressing or reduced-fat mayonnaise, all the components below except vinegar are added in one mix tank:

| Ingredient | Wt % |
|---|---|
| H$_2$O | 32.1 |
| Egg products, spices, flavors and preservatives | 5.1 |
| Sugar/salt | 8.7 |
| Oil | 43.3 |
| Instant Starch | 3.3 |
| Vinegar | 7.5 |

All the components listed in the component table, except vinegar, are added in a low shear Lightnin™ mixer for 1–5 minutes to form a thin coarse emulsion. This emulsion was passed through a high shear Pentax™ parallel mixer. Vinegar was added in the high shear device during the high shear treatment to form a viscous dressing product. The coarse emulsion to vinegar flow rates in the high shear device were maintained at a ratio of 92.5 to 7.5 respectively. The peak shear rate was about 17,000 sec$^{-1}$.

To test the effect of temperature and flow rate through the high shear device, the same components combined to produce the viscous salad dressing or reduced-fat mayonnaise in Example 4 were combined in the same way, but subjected to three different flow rates in a 3 lb. capacity shear device at the different temperatures. The three different flow rates were: Flow Rate 1, 20 lb/min; Flow Rate 2, 13.3 lb/min; and Flow Rate 3, 6.7 lb/min. The peak shear rate was about 17,000 sec$^{-1}$. As can be seen in the results in Table XI, a higher flow rate at a lower temperature resulted in a product with a higher yield stress than a product subjected to a lower flow rate at a higher temperature.

TABLE XI

Yield Stress as a Function of Time

| Shear Conditions | | | Yield Stress τ(Pa) | | | |
|---|---|---|---|---|---|---|
| Sample | Temp (° C.) | Flowrate | 24 hrs | 1 week | 2 weeks | 1 month |
| 1 | 21 | 1 | 376 | 358 | 341 | 333 |
| 2 | 21 | 2 | 317 | 339 | 331 | 310 |
| 3 | 21 | 3 | 193 | 207 | 205 | 198 |
| 4 | 32 | 1 | 337 | 392 | 368 | 326 |
| 5 | 32 | 2 | 310 | 353 | 336 | 319 |
| 6 | 32 | 3 | 155 | 155 | 157 | 140 |
| 7 | 43 | 1 | 324 | 370 | 350 | 332 |
| 8 | 43 | 2 | 267 | 284 | 278 | 273 |
| 9 | 43 | 3 | 107 | 107 | 106 | 997 |
| 10 | 54 | 1 | 360 | 379 | 344 | 328 |
| 11 | 54 | 2 | 259 | 263 | 274 | 254 |
| 12 | 54 | 3 | 94 | 103 | 95 | 76.8 |

EXAMPLE 6

One-Pot Process for Making Reduced-Fat Viscous Salad Dressing or Reduced-Fat Mayonnaise This example illustrates the process of FIG. 2. The formula for the one pot process for making a reduced-fat viscous dressing or reduced-fat mayonnaise is set forth below.

| Ingredient | Sample 5 | Sample 6 | Sample 7 |
|---|---|---|---|
| Oil | 43.3% | 38.3% | 33.3% |
| Instant Starch | 3.3% | 3.7% | 4.0% |
| Egg products, spices, flavorings, preservatives | 5.1% | 5.1% | 5.1% |
| Sugar/Salt | 8.7% | 8.7% | 8.7% |
| Room Temperature H₂O | 32.1% | 36.7% | 41.4% |
| Vinegar | 7.5% | 7.5% | 7.5% |

In a one pot process for making a reduced-fat viscous salad dressing or reduced-fat mayonnaise, the starch is added to oil and mixed to form a slurry. The remaining ingredients, except vinegar, are added in a low shear Lightnin™ mixer for 1–5 minutes to form a thin coarse emulsion. Vinegar was added in a high shear Pentax™ parallel mixer to form a viscous dressing product. The coarse emulsion to vinegar flow rates in the high shear device were maintained at a ratio of 92.5 to 7.5 respectively. The peak shear rate was about 17,000 sec$^{-1}$. The results of the yield stress, oil particle size and percent change in conductivity are reported in Tables XII and XIV.

TABLE XII

Yield Stress as a Function of Time

| | Average Yield Stress τ(Pa) | | | | | |
|---|---|---|---|---|---|---|
| Sample/Starch | 24 hr | 1 wk | 2 wk | 4 wk | 8 wk | 12 wk |
| #5/3.3% Mira-Sperse 623 ™ | 382.50 | 369.00 | 333.00 | 330.50 | 319.00 | 312.00 |
| #6/5% RO, 3.7% Mira-Sperse 623 ™ | 416.00 | 386.50 | 393.00 | 389.50 | 376.00 | 359.00 |
| #7/10% RO, 4% Mira-Sperse 623 ™ | 293.50 | 301.00 | 284.00 | 278.00 | 269.00 | 257.00 |

TABLE XIII

Particle Size

| Sample/Starch | Mean Particle Size (μ) at Day 4 |
|---|---|
| #5/3.3% Mira-Sperse 623 ™ | 1.88 |
| #6/5% RO 3.7% Mira-Sperse 623 ™ | 1.79 |
| #7/10% RO 4% Mira-Sperse 623 ™ | 1.56 |

TABLE XI

Change of Conductivity as a Function of Time

| | Change of Conductivity (%) | |
|---|---|---|
| Sample/Starch | 24 hrs | 4 wks |
| #5/3.3% Mira-Sperse 623 ™ | 3.85 | 3.86 |
| #6/5% RO, 3.7% Mira-Sperse 623 ™ | 5.94 | 5.66 |
| #7/10% RO, 4% Mira-Sperse 623 ™ | 6.29 | 5.94 |

As can be seen from the data presented here, the yield stress, mean particle size, and change in conductivity of the viscous dressing products of the invention are comparable to those parameters as measured in a conventionally-generated (control) viscous dressing.

EXAMPLE 7

One-Pot Process for Making Reduced-Fat Viscous Salad Dressing or Reduced-Fat Mayonnaise This example illustrates the process of FIG. 2 The formula for the one pot process for making a reduced-fat viscous dressing or reduced-fat mayonnaise is set forth below.

| Ingredient | Sample 4 | Sample 5 | Sample 6 |
|---|---|---|---|
| Oil | 43.3 | 38.3 | 33.3 |
| Instant Starch | 3.3 | 3.7 | 4.1 |
| Egg product, spices, flavorings, preservatives | 5.1 | 5.1 | 5.1 |
| Sugar/Salt | 8.7 | 8.7 | 8.7 |
| H₂O (25° C.) | 32.1 | 36.7 | 41.3 |
| Vinegar | 7.5 | 7.5 | 7.5 |

In a one pot process for making a reduced-fat salad dressing or a reduced-fat mayonnaise, the protocol used in Example 6 was used. The results of the yield stress, oil particle size and percent change in conductivity are reported in Tables XV–XVIII.

TABLE XV

Yield Stress as a Function of Time.

| | Average Yield Stress τ(Pa) | | | | |
|---|---|---|---|---|---|
| Sample/Starch | 24 hr | 1 wk | 2 wk | 4 wk | 8 wk |
| #4/3.3% Mira-Sperse 623 ™ | 385.00 | 379.50 | 373.50 | 380.00 | 369.00 |
| #5/5% RO, 3.7% Mira-Sperse 623 ™ | 367.50 | 360.00 | 354.00 | 344.50 | 332.00 |
| #6/10% RO, 4.1% Mira-Sperse 623 ™ | 325.50 | 313.50 | 305.50 | 297.50 | 276.00 |

TABLE XVI

Particle Size as a Function of Time

| | Mean Particle Size (μ) | | Change of Conductivity (%) | |
|---|---|---|---|---|
| Sample/Starch | 4 day | 5 week | 24 Hours | 3 Weeks |
| #4/3.3% Mira-Sperse 623 ™ | 2.01 | 1.96 | 5.90 | 9.85 |
| #5/5% RO, 3.7% Mira-Sperse 623 ™ | 1.97 | 2.03 | 6.80 | 6.63 |
| #6/10% RO, 4.1% Mira-Sperse 623 ™ | 1.89 | 1.97 | 6.42 | 10.03 |

As can be seen from the data presented here, the yield stress, mean particle size, and change in conductivity of the viscous dressing products of the invention are comparable to those parameters as measured in a conventionally-generated (control) viscous dressing.

EXAMPLE 8

One-Pot Process for Making Reduced-Fat Viscous Salad Dressing or Reduced-Fat Mayonnaise This example illustrates the process of FIG. 2. The formula for the one pot process for making a reduced-fat viscous dressing or reduced-fat mayonnaise is set forth below.

| Ingredient Name | Sample 1 (Wt %) | Sample 2 (Wt %) | Sample 3 (Wt %) | Sample 4 (Wt %) |
|---|---|---|---|---|
| Oil | 43.3 | 33.3 | 33.3 | 33.3 |
| Instant Starch | 3.3 | 4.1 | 4.2 | 4.3 |
| Egg products, spices, flavorings, preservatives | 5.1 | 5.1 | 5.1 | 5.1 |
| Sugar/Salt | 8.7 | 8.7 | 8.7 | 8.7 |
| Room Temperature H₂O | 32.1 | 41.3 | 41.2 | 41.1 |
| Vinegar | 7.5 | 7.5 | 7.5 | 7.5 |

In a one pot process for making a reduced-fat salad dressing or a reduced-fat mayonnaise, the protocol used in Example 6 was used. The results of the yield stress, oil particle size and percent change in conductivity are reported in Tables XVIII–XX.

TABLE XVIII

Yield Stress as a Function of Time

| | Average Yield Stress τ(Pa) | | | |
|---|---|---|---|---|
| Sample/Starch | 24 hr | 1 wk | 2 wk | 4 wk |
| #1/3.3% Mira-Sperse 623 ™ | 374.5 | 362.50 | 361.00 | 349.50 |
| #2/4.1% Mira-Sperse 623 ™, 10% RO | 280.5 | 271.50 | 278.00 | 278.00 |
| #3/4.2% Mira-Sperse 623 ™, 10% RO | 300.5 | 295.00 | 299.50 | 291.00 |
| #4/4.3% Mira-Sperse 623 ™, 10% RO | 325.5 | 315.50 | 319.00 | 306.50 |

TABLE XIX

Particle Size

| Sample/Starch | Mean Particle Size at 24 hrs |
|---|---|
| #1/3.3% Mira-Sperse 623 ™ | 1.48 |
| #2/4.1% Mira-Sperse 623 ™, 10% RO | 1.58 |
| #3/4.2% Mira-Sperse 623 ™, 10% RO | 1.43 |
| #4/4.3% Mira-Sperse 623 ™ 10% RO | 1.42 |

TABLE XX

Change in Conductivity as a Function of Time

| Sample/Starch | | Change of Conductivity (%) at 1 week |
|---|---|---|
| #1 / 3.3% | Mira-Sperse 623 ™ | 8.79 |
| #2 / 4.1% | Mira-Sperse 623 ™, 10% RO | 7.73 |
| #3 / 4.2% | Mira-Sperse 623 ™, 10% RO | 7.81 |
| #4 / 4.3% | Mira-Sperse 623 ™, 10% RO | 8.28 |

As can be seen from the data presented in this Example, the yield stress, mean particle size and change in conductivity of the viscous dressing products of the invention are comparable to those parameters measured in a conventionally-generated (control) viscous dressing product as illustrated in Examples 1, 3, 6 and 7.

EXAMPLE 9

One-Pot Process for Making Reduced-Fat or Fat-Free Viscous Dressing

This example corresponds to FIG. 5. In a one pot process for making a reduced-fat or fat-free viscous dressing all the components listed below are combined in one mix tank:

| Ingredients | Wt % |
|---|---|
| Water | 77.50 |
| Salt/Sugar | 6.80 |
| Gum | 2.12 |
| Vinegar 120 grain | 3.15 |

-continued

| Ingredients | Wt % |
|---|---|
| Natural/Artificial Colors/Flavor/Vitamins/Preservatives | 4.73 |
| Corn Syrup | 2.40 |
| Mira-Thik 603 ™ | 3.30 |

In a 1 pot procedure the reduced-fat or fat-free viscous dressing was prepared as follows: water was added to a mixing vessel under agitation. Vinegar, sugar, spices, vitamins, preservatives and colors were added to the mixing vessel to form a mixture. Starch was then added to the mixture. This combination of components was mixed for 1–2 minutes until dispersed. Salt, xanthan, cellulose gel, and additional flavors were added and mixed until well dispersed and homogeneous. The resulting mixture was then passed through a high shear Pentax™ mixer and the conditions for shear are 17,000 sec$^{-1}$ or the equivalent of such conditions. The resulting reduced-fat or fat-free viscous dressing had similar yield stress values as viscous dressing products made by a conventional procedure with cooked starch.

TABLE XXI

Yield Stress as a Function of Time

| Time | Average Yield Stress τ(Pa) |
|---|---|
| 24 hours | 170 |
| 1 week | 165 |
| 2 weeks | 159 |
| 4 weeks | 180 |
| 2 months | 183 |

EXAMPLE 10

One-Pot Full-Fat Viscous Salad Dressing Made with Vinegar Added Substantially Before Subjecting Coarse Emulsion to High Shear Treatment This examples shows that the addition of the edible acid significantly prior to the high shear treatment results in an unstable emulsion.

The formulation consisted of:

| Ingredients | Wt % |
|---|---|
| Soybean oil | 43.3 |
| Mira-Thik 603 ™ | 3.5 |
| Egg Products/Spices/Flavors/Preservatives | 5.1 |
| Sugar/Salt | 8.7 |
| Water | 32.1 |

The protocol utilized was as follows: 60° C. water was added to a bowl. Egg products/spices/flavors/preservatives, sugar and salt were added to the water with low shear mixing. An oil-starch slurry was added to the resulting mixture. The remaining oil was added with mixing to form a coarse emulsion. Vinegar was added at low shear and the coarse emulsion was mixed for about two minutes. The coarse emulsion was subjected to high shear in a Pentax™ mixer at a peak shear rate of 17,000 sec$^{-1}$ or equivalent conditions of shear. The resulting emulsion was effectively broken as evidenced by the presence of oil at the surface of the product after the high shear treatment, indicating the emulsion was unstable. Because the emulsion broke, the centrifugation, conductivity, yield stress and particle size analysis were not undertaken.

EXAMPLE 11

Full-Fat Viscous Dressing Made With Too High Shear Rate

A full-fat viscous dressing was made as described in Example 4, except the peak shear rate ranged from 40,000 sec$^{-1}$ to 80,000 sec$^{-1}$. The resulting emulsion broke, indicating that such shear rates are excessive are generally unsuitable for preparing emulsion under the conditions of Example 4. Because the emulsion broke, the centrifugation, conductivity, yield stress and particle size analysis were not undertaken.

We claim:

1. A viscous dressing product comprising a mixture comprising a starch dispersed in oil, an egg product, a spice, a flavoring ingredient, a preservative, sugar, salt, and an acidic component, wherein the viscous dressing product has a yield stress of about 150 τ(Pa) to about 400 τ(Pa), which is maintained for at least twelve weeks after the viscous dressing product is first formed from the mixture; and wherein the viscous dressing product contains oil droplets having a mean particle size of about 1.5μ to about 3.5μ, which mean particle size is maintained for at least four weeks after the viscous dressing product is first formed from the mixture.

2. The viscous dressing product as defined in claim 1, wherein the viscous dressing product is a salad dressing containing less than about 45% fat.

3. The viscous dressing product as defined in claim 1, wherein the viscous dressing product is a salad dressing containing greater than or equal to about 45% fat.

4. The viscous dressing product as defined in claim 1, wherein the viscous dressing product is a mayonnaise containing less than about 45% fat.

5. The viscous dressing product as defined in claim 1, wherein the viscous dressing product develops a pH of about 3 to about 5 within at least about 24 hours after the viscous dressing product is first formed from the mixture.

6. The viscous dressing product as defined in claim 1, wherein the viscous dressing product has a yield stress of about 200τ(Pa) to about 400τ(Pa).

7. A method for making a viscous dressing product, said method comprising:
   (a) dispersing a starch in an edible oil;
   (b) forming a mixture comprising the dispersed starch in the edible oil, water, an egg product, salt, sugar, a preservative, and a spice; and
   (c) applying a peak shear force of about 3,000 sec$^{-1}$ to about 20,000 sec$^{-1}$ to the mixture for a time sufficient to form an emulsion;
      wherein the mixture also contains an edible acid which is added to the mixture either (1) within about 15 seconds before the application of the high shear force or (2) during the application of the high shear force or (3) after the application of the high shear force; wherein the emulsion formed containing the edible acid is the viscous dressing product, and wherein the viscous dressing product has a yield stress of about 150 τ(Pa) to about 400 τ(Pa) and a mean particulate size of about 1.5μ to about 3.5 μ.

8. The method as defined in claim 7, wherein the viscous dressing product develops a pH of about 3 to about 5 within at least 24 hours after the viscous dressing product is first formed from the mixture.

9. The method as defined in claim 7, wherein the viscous dressing product has a yield stress of about 200 τ(Pa) to about 400 τ(Pa) within at least twelve weeks after the viscous dressing product is formed.

10. The method as defined in claim 7, wherein the mean particle size is maintained for at least four weeks after the viscous dressing product is first formed from the mixture.

11. A fat-free viscous dressing product comprising a mixture comprising a cold water swelling starch dispersed in water, xanthan, cellulose gel, an egg product, a spice, a preservative, sugar, salt, and an edible acid, wherein the fat-free viscous dressing product has a yield stress of about 150 τ(Pa) to about 400 τ(Pa) which is maintained for at least twelve weeks after the fat-free viscous dressing product is first formed from the mixture.

12. A one-pot method for making a fat-free viscous dressing product, said method comprising:
 (a) dispersing a cold water swelling starch in water;
 (b) forming a mixture comprising the starch dispersed in water, an egg product, salt, sugar, a preservative, a spice, xanthan, cellulose gel and an edible acid;
 (c) applying a peak shear force of about 3,000 sec$^{-1}$ to about 80,000 sec$^{-1}$ to the mixture for a time sufficient to form a dispersion; and
  wherein the dispersion formed is the fat-free viscous dressing product.

13. The method as defined in claim 12, wherein the viscous dressing product has a yield stress of about 150 τ(Pa) to about 400 τ(Pa) within at least twelve weeks after the viscous dressing product is formed.

14. A one-pot method for making a viscous dressing product, said method comprising:
 (a) applying a low shear force to form a mixture comprising cold water swelling starch, an edible oil, water, an egg product, salt, a spice, and a preservative;
 (b) applying a peak shear force of about 3,000 sec$^{-1}$ to about 20,000 sec$^{-1}$ to the mixture for a time sufficient to form an emulsion;
  wherein the mixture also contains an edible acid which is added to the mixture either (1) within about 15 seconds before the application of the high shear force or (2) during the application of the high shear force or (3) after the application of the high shear force; and wherein the emulsion formed containing the edible acid is the viscous dressing product.

15. The method defined in claim 14, wherein the viscous dressing product develops a pH of about 3 to about 5 within at least about 24 hours after the viscous dressing product is first formed from the mixture.

16. The method as defined in claim 14, wherein the viscous dressing product has a yield stress of about 200 τ(Pa) to about 400 τ(Pa) within at least twelve weeks after the viscous dressing product is formed.

17. A one-pot method for making a fat-free viscous dressing product, said method comprising:
 (a) applying a low shear force to form a mixture of a cold water swelling starch, water, an egg product, salt, xanthan, cellulose gel, an edible acid, a spice, and a preservative;
 (b) applying a peak shear force of about 3,000 sec$^{-1}$ to about 80,000 sec$^{-1}$ to the mixture for a time sufficient to form a dispersion; and wherein the dispersion formed is the fat-free viscous dressing product.

18. The method as defined in claim 17, wherein the fat-free viscous dressing product has a yield stress of about 150 τ(Pa) to about 400 τ(Pa) within at least twelve weeks after the fat-free viscous dressing product is formed.

* * * * *